Patented Dec. 1, 1953

2,661,300

UNITED STATES PATENT OFFICE 2,661,300

ASPHALT CUTBACKS

Joseph W. Romberg and Ralph N. Traxler, Port Neches, Tex., assignors to The Texas Company, New York, N. Y., a corporation of Delaware No Drawing. Application July 6, 1949, Serial No. 103,328

3 Claims. (Cl. 106—278)

This invention relates to asphalt cutbacks adapted for surfacing materials and for road building purposes and contemplates the preparation of asphalt cutbacks containing liquid organic silicones. The invention is particularly directed to the preparation of asphalt cutbacks adapted to be employed with aggregate in road construction.

Asphalt cutbacks are composed of a base of asphaltic material and a naphtha or volatile component. For road building purposes it is desirable that the cutback be sufficiently liquid for proper application to the aggregate during mixing and that it be capable of being cured by evaporation to a consistency which is adapted to provide a stable road material. It is desirable that the curing or evaporation should take place at the rate adapted for the conditions under which the cutback material is employed. Thus, if evaporation of volatiles is too rapid, a high loss of volatiles may take place during mixing and immediately thereafter with the result that the material may "set up" during transportation and may be difficult to unload. On the other hand, if the rate of curing is too slow, excess blading and aeration may be required in handling the cutback material.

The curing index test is a quantitative test for measuring the retentivity of an asphalt for the naphtha or volatile component. The Texas State Highway Department has developed a method of determining the curing index which is described in the Journal of Asphalt Technology, vol. II, No. 6, 1943. By determining the curing index of an asphalt cutback and obtaining this quantitative test of the rate of curing, it is possible in practice to determine whether a given cutback material is adapted for a particular purpose.

In accordance with the present invention, it has been found that the addition of liquid organic silicones to asphalt cutbacks functions to increase the curing index, that is, to increase the retentivity of the asphalt for the naphtha or volatile component. It was found that minute additions of the silicones to the cutbacks produced surprising effects on the curing index and on the distillation. A quantity of silicones as small as about 10 parts per million by volume produces an appreciable increase in the curing index and suppresses evaporation in the distillation test of the asphalt cutback. This effect on the distillation appears to reach a maximum with proportions of silicones approximating 50 parts per million and additional proportions do not materially augment the effect. With respect to the curing index, however, increasing the proportion of silicones results in increasing the curing index or retentivity of the asphalt for the naphtha. The addition of the silicones to the cutback also functions to increase the penetration and decrease the ductility of the residue obtained in distilling the cutback.

The organic silicones useful for the purposes of the present invention include the polymeric organic silicon oxide condensation products. These products are sometimes referred to as organo-siloxanes. Structurally these compounds are composed essentially of a plurality of silicon atoms linked together through oxygen atoms with each silicon atom having attached to it at least one organic radical. The oily liquid condensation products obtained by the polymerization of organo-silane diols (each silicon atom having attached two organic radicals) such as, for example, the dimethyl silicones, are well adapted for the purposes of the present invention.

In practicing the invention the asphalt base material is composed of an asphaltic residue such as is obtained by vacuum or steam distillation or air blowing of crude petroleum residues. The volatile component in the mixture consists of naphtha preferably of petroleum origin and having initial boiling points approximating 150° F. and end points of the order of 400–450° F.

The silicone material is added to the asphalt cutback mixture in minute amounts of at least about 10 to 50 parts per million. Additional proportions of silicones may be used depending upon the increase in curing index desired.

In a specific example of the invention an asphalt cutback was prepared with an asphalt obtained by vacuum distillation of a Gulf Coast crude residuum and having a ring and ball softening point of 111° F., a ductility at 77° F. of 200+ and a penetration at 77° F. of 116. The naphtha used had an initial boiling point of 158° F. and an end point of 396° F. The mixture was prepared with 72 per cent by volume of the asphalt and 28 per cent of the naphtha. A dimethyl silicone polymer obtained from the Dow Corning Corporation under the trade name of "200 Dow Corning Fluid" and having a viscosity of 100 centipoises was added to the cutback mixture. Three different mixtures were prepared, one with 10 parts per million, one with 50 parts per million and one with 100 parts per million of the silicone. The curing index was determined in accordance with the Texas State Highway method except that the Hoeppler viscosimeter was used in place of the float test; the cured out point was taken as 360 poises at 122° F. The table which follows shows the effect of the silicones in raising the curing index and in suppressing the distillation.

|  | Asphalt-Naphtha Mixture | Asphalt-Naphtha Mixture With Silicone | | |
|---|---|---|---|---|
|  |  | 10 p.p.m. | 50 p.p.m. | 100 p.p.m. |
| Saybolt-Furol Viscosity at 140° F | 118 | 118 | 118 | 118 |
| Distillation: |  |  |  |  |
| Initial boiling point ° F | 290 | 316 | 314 | 306 |
| Percent off at: |  |  |  |  |
| 320° F | 1.0 | 0.0 | 0.5 | 0.5 |
| 347° F | 4.5 | 3.0 | 1.5 | 1.5 |
| 374° F | 8.0 | 5.5 | 5.0 | 5.0 |
| 437° F | 16.0 | 15.0 | 14.0 | 14.0 |
| 500° F | 21.0 | 20.0 | 20.0 | 20.0 |
| 600° F | 25.0 | 24.0 | 24.0 | 24.0 |
| 680° F | 26.5 | 26.5 | 26.5 | 26.5 |
| Residue: |  |  |  |  |
| Penetration at 77° F | 109 | 137 | 142 | 145 |
| Ductility at 77° F | 200+ | 132 | 134 | 138 |
| Mls. over at cured out point | 19.9 | 19.7 | 19.5 | 20.0 |
| Curing Index | 25 | 33 | 36 | 41 |

Although a preferred embodiment of the invention has been described herein, it will be understood that various changes and modifications may be made therein, while securing to a greater or less extent some or all of the benefits of the invention, without departing from the spirit and scope thereof.

We claim:

1. An asphalt cutback composition adapted for application to aggregate in road building and composed essentially of asphalt and naphtha in proportions adapted for application to aggregate in road building and about 10–100 parts per million by volume of a liquid lower dialkyl silicone polymer effective to suppress evaporation of the naphtha and increase the curing index of the cutback composition.

2. An asphalt cutback composition in accordance with claim 1 wherein the liquid dihydrocarbon silicone polymer is a dimethyl silicone polymer.

3. An asphalt cutback composition adapted for application to aggregate in road building and composed essentially of asphalt and naphtha in proportions adapted for application to aggregate in road building and about 10–50 parts per million by volume of a liquid lower dialkyl silicone polymer effective to suppress evaporation of the naphtha and increase the curing index of the cutback composition.

JOSEPH W. ROMBERG.
RALPH N. TRAXLER.

References Cited in the file of this patent

UNITED STATES PATENTS

| Number | Name | Date |
|---|---|---|
| 2,258,218 | Rochow | Oct. 7, 1941 |
| 2,314,181 | Winterkorn | Mar. 16, 1943 |
| 2,581,685 | McMillan | Jan. 8, 1952 |

OTHER REFERENCES

Oil and Gas Journal, Oct. 6, 1945, pages 87 and 88.